United States Patent
Hashimoto et al.

(10) Patent No.: US 10,066,725 B2
(45) Date of Patent: Sep. 4, 2018

(54) FIBER REINFORCED RESIN GEAR, METHOD OF FORMING FIBER REINFORCED RESIN GEAR BY INJECTION MOLDING, FIBER REINFORCED RESIN ROTARY BODY, METHOD OF FORMING FIBER REINFORCED RESIN ROTARY BODY BY INJECTION MOLDING

(71) Applicant: Enplas Corporation, Saitama (JP)

(72) Inventors: Masaomi Hashimoto, Saitama (JP); Kazuma Yanagisawa, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/677,396

(22) Filed: Aug. 15, 2017

(65) Prior Publication Data
US 2018/0003281 A1    Jan. 4, 2018

Related U.S. Application Data

(62) Division of application No. 14/324,356, filed on Jul. 7, 2014, now Pat. No. 9,772,023.

(30) Foreign Application Priority Data

Jul. 5, 2013 (JP) .................................. 2013-141704

(51) Int. Cl.
*B29C 45/00* (2006.01)
*F16H 55/06* (2006.01)
(Continued)

(52) U.S. Cl.
CPC ......... *F16H 55/06* (2013.01); *B29C 45/0005* (2013.01); *B29C 45/0025* (2013.01);
(Continued)

(58) Field of Classification Search
CPC ............... F16H 55/065; B29C 45/0025; B29C 45/0046; B29C 2045/0039
See application file for complete search history.

(56) References Cited

U.S. PATENT DOCUMENTS

| 6,070,484 A | 6/2000 | Sakamaki |
| 6,214,277 B1 | 4/2001 | Saigo |

(Continued)

FOREIGN PATENT DOCUMENTS

| JP | 10-034762 | 2/1998 |
| JP | 2003-231156 | 8/2003 |
| JP | 2008-149502 | 7/2008 |

*Primary Examiner* — William Kelleher
*Assistant Examiner* — Gregory T Prather
(74) *Attorney, Agent, or Firm* — Wenderoth, Lind & Ponack, L.L.P.

(57) ABSTRACT

Plural ejector pins are made to project before a molten resin containing reinforcing fibers is injected into an inside of a cavity through pin point gates in a web forming portion in the inside of the cavity and at positions outside the pin point gates in a radial direction. The ejector pins are retracted from the inside of the cavity after a flow of the molten resin containing reinforcing fibers injected into the inside of the cavity through the pin point gates impinges on the ejector pins and is divided and before a tooth portion forming portion in the inside of the cavity is filled with the molten resin containing reinforcing fibers. Accordingly, weld lines which extend along the radial direction are formed at positions outside the ejector pins in the radial direction, and the molten resin is filled in portions formed after the ejector pins are retracted.

2 Claims, 7 Drawing Sheets

(51) Int. Cl.
   *B29C 45/40*      (2006.01)
   *B29C 45/27*          (2006.01)
   *B29K 105/14*         (2006.01)
   *B29L 15/00*          (2006.01)
(52) U.S. Cl.
   CPC ........ *B29C 45/401* (2013.01); *B29C 45/2708* (2013.01); *B29C 45/40* (2013.01); *B29C 2045/0006* (2013.01); *B29C 2045/0043* (2013.01); *B29C 2045/0049* (2013.01); *B29K 2105/14* (2013.01); *B29L 2015/003* (2013.01); *F16H 2055/065* (2013.01); *Y10T 74/1987* (2015.01)

(56) References Cited

U.S. PATENT DOCUMENTS

| | | |
|---|---|---|
| 6,433,071 B1 | 8/2002 | Arai |
| 2001/0039730 A1 | 11/2001 | Fujita |
| 2003/0045621 A1 | 3/2003 | Aramaki |
| 2003/0131678 A1* | 7/2003 | Noguchi ............. B29C 45/0046 74/434 |
| 2004/0241276 A1 | 12/2004 | Miyasaka |
| 2005/0097744 A1 | 5/2005 | Arai |
| 2007/0186710 A1 | 8/2007 | Miyauchi |
| 2008/0073816 A1* | 3/2008 | Oberle ................ B29C 45/0025 264/328.14 |
| 2008/0146402 A1 | 6/2008 | Shinohara |
| 2009/0011071 A1 | 1/2009 | Hagihara |
| 2010/0307274 A1 | 12/2010 | Akiyama |
| 2013/0220048 A1* | 8/2013 | Iijima ................. B29C 45/0025 74/434 |
| 2015/0345609 A1* | 12/2015 | Kiyota ................... F16H 55/06 180/444 |
| 2016/0017976 A1* | 1/2016 | Iijima .................... F16H 55/06 74/446 |

* cited by examiner

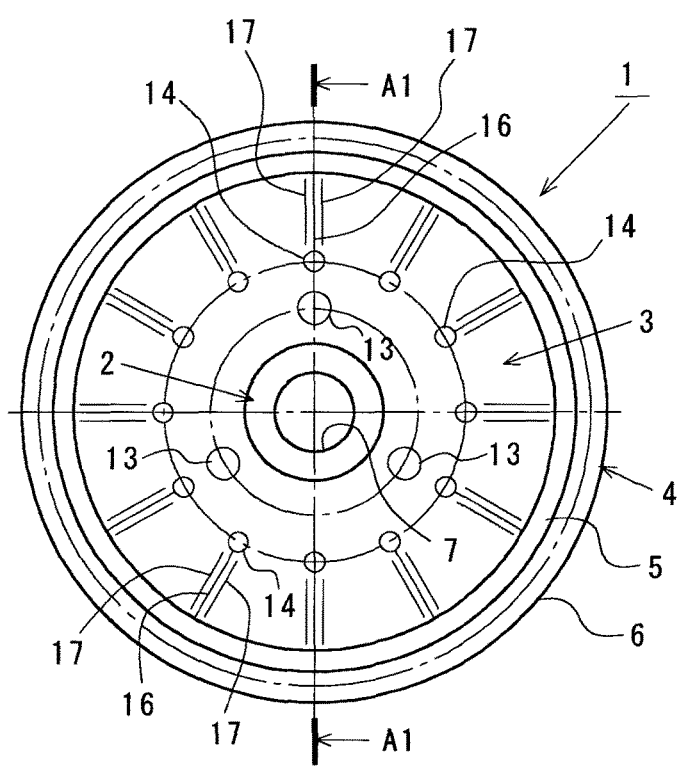
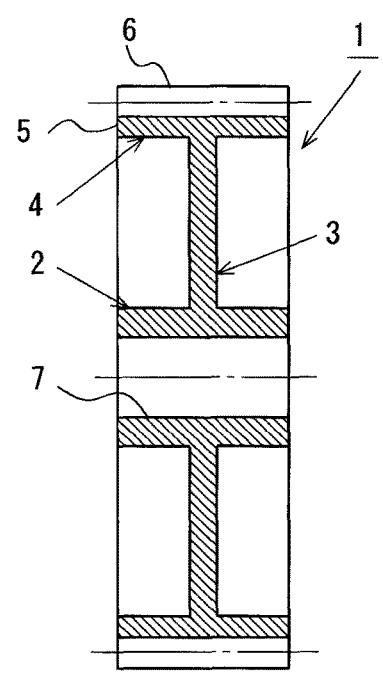
FIG. 1A
FIG. 1B

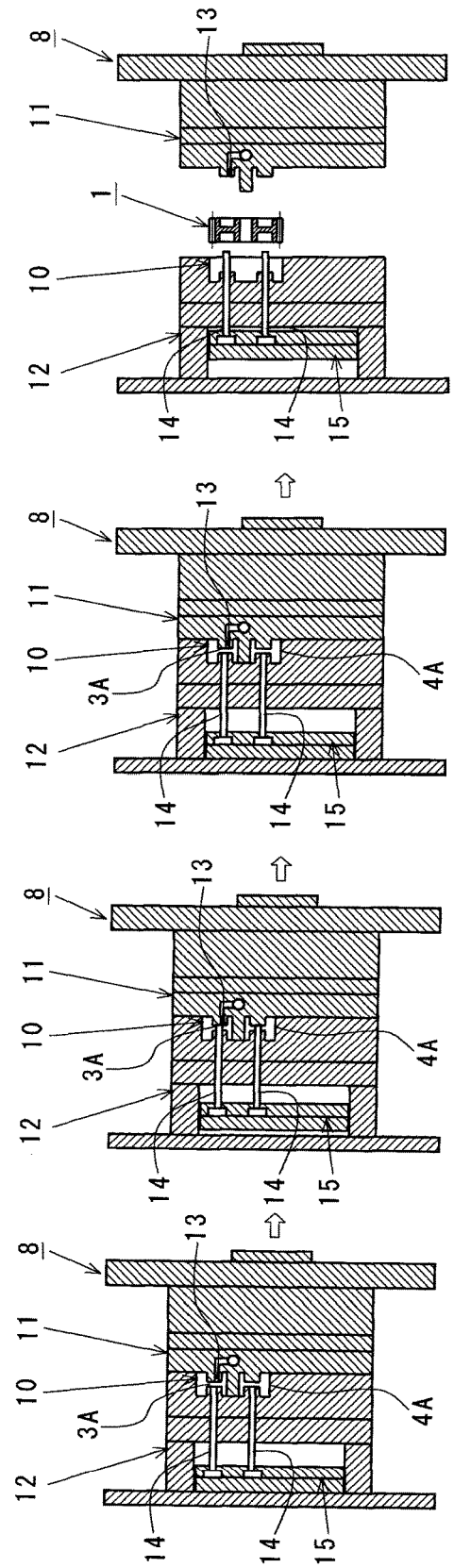

FIBER REINFORCED RESIN GEAR, METHOD OF FORMING FIBER REINFORCED RESIN GEAR BY INJECTION MOLDING, FIBER REINFORCED RESIN ROTARY BODY, METHOD OF FORMING FIBER REINFORCED RESIN ROTARY BODY BY INJECTION MOLDING

BACKGROUND OF THE INVENTION

1. Field of the Invention

The present invention relates to a fiber reinforced resin gear formed using a resin which contains reinforcing fibers, a fiber reinforced resin rotary body, and a method of forming the fiber reinforced resin gear and the fiber reinforced resin rotary body by injection molding.

2. Description of the Related Art

Conventionally, in a power transmission mechanism of various machines such as an automobile, an industrial machine or a copier, a fiber reinforced resin gear having high strength is used in place of a metal-made gear. Such a fiber reinforced resin gear is manufactured by injecting a molten resin which contains reinforcing fibers such as glass fibers or carbon fibers into the inside of a cavity. However, it has been known that such a fiber reinforced resin gear has a drawback in that the difference in shrinkage ratio attributed to non-uniformity of the fiber orientation of reinforcing fibers is generated so that roundness of the fiber reinforced resin gear after forming is deteriorated.

(First Example of Related Art)

FIG. 5 schematically shows the orientation of fibers in a fiber reinforced resin gear 100 according to a first example of related art. In the fiber reinforced resin gear 100 shown in FIG. 5, a weld line 102 which extends in a radial direction is formed in portions where a molten resin containing reinforcing fibers injected into the inside of a cavity 100A through pin point gates 101 arranged adjacent to each other are merged with each other, reinforcing fibers 103 are oriented in a direction substantially along the weld line 102 on the weld line 102 and areas in the vicinity of the weld line 102, and the reinforcing fibers 103 are aligned in the direction substantially along a circumferential direction at positions between the weld lines 102, 102. As a result, a shrinkage of the fiber reinforced resin gear 100 in the radial direction becomes small on the weld line 102 and in areas in the vicinity of the weld line 102, and the shrinkage of the fiber reinforced resin gear 100 in the radial direction becomes large between the weld lines 102, 102 thus deteriorating addendum roundness of a tooth portion 104.

(Second Example of Related Art)

FIG. 6 shows a fiber reinforced resin gear 110 according to a second example of related art. The fiber reinforced resin gear 110 shown in FIG. 6 is a gear whose addendum roundness of a tooth portion 111 is improved compared to that of the fiber reinforced resin gear 100 according to the first example of related art. The fiber reinforced resin gear 110 according to the second example of related art adopts a multi-gate structure in which the number of pin point gates 112 at the time of injection molding is seven or more. By increasing the number of weld lines 113 thus decreasing a width (width along the circumferential direction) between the weld lines 113, 113, the number of portions where a shrinkage in the radial direction is small is increased, and the number of portions where the shrinkage in the radial direction is large is decreased so that irregularity in shrinkage in the radial direction is suppressed, whereby addendum roundness can be improved (refer to Japanese Unexamined Patent Application Publication No. JP-A-2008-149502).

(Third Example of Related Art)

FIG. 7A and FIG. 7B show a fiber reinforced resin gear 120 according to a third example of related art. The fiber reinforced resin gear 120 shown in FIG. 7A and FIG. 7B is a gear whose addendum roundness of a tooth portion 121 is improved compared to that of the fiber reinforced resin gear 100 according to the first example of related art. The fiber reinforced resin gear 120 according to the third example of related art is formed by injection molding using an injection molding die 122 shown in FIG. 8A and FIG. 8B.

In the injection molding die 122 shown in FIG. 8A and FIG. 8B, in the inside of a cavity 123 and at positions outside a plurality of pin point gates 124 in the radial direction, small circular pillars 125 are arranged corresponding to the respective pin point gates 124, and a weld line 126 which extends in the radial direction is formed between the pin point gates 124, 124 arranged adjacent to each other. Further, the weld lines 126 which extend along the radial direction and the number of which is equal to the number of small circular pillars 125 are formed outside the small circular pillars 125 in the radial direction and hence, the number of weld lines 126 is doubled. As a result, irregularity in the shrinkage ratio of the fiber reinforced resin gear 120 in the radial direction is decreased, and therefore roundness of the fiber reinforced resin gear 120 is improved (refer to Japanese Unexamined Patent Application Publication No. JP-A-10-34762 and Japanese Unexamined Patent Application Publication No. JP-A-2003-231156).

However, in the fiber reinforced resin gear 110 according to the second example of related art, it is necessary to apply machining to the injection molding die to increase the number of pin point gates 112, thus causing the drawback of increasing a cost of machining the injection molding die. Further, in the fiber reinforced resin gear 110 according to the second example of related art, there may be a case where the desired number of pin point gates 112 cannot be formed depending on data on the gear.

Further, in the fiber reinforced resin gear 120 according to the third example of related art, as shown in FIG. 7A and FIG. 7B, holes 127 corresponding to the small circular pillars 125 are formed in a web 128 of a number corresponding to the number of small circular pillars 125. Accordingly, with respect to the fiber reinforced resin gear 120 according to the third example of related art, for example, there arises a case where radial ribs or circumferential ribs cannot be formed on side surfaces of the web 128, although it is desirable to form such ribs, thus causing the drawback of decreasing the degree of freedom in design. Further, in the fiber reinforced resin gear 120 according to the third example of related art, when the formation of the plurality of holes 127 in the web 128 is not allowed from a viewpoint of strength of the fiber reinforced resin gear 120, there arises a drawback that the fiber reinforced resin gear 120 of the third example is not useful.

SUMMARY OF THE INVENTION

Accordingly, it is an object of the invention to provide a fiber reinforced resin gear, a fiber reinforced resin rotary body and a method of forming the fiber reinforced resin gear and the fiber reinforced resin rotary body by injection molding which can improve roundness of the gear or the rotary body without increasing a cost of machining an injection molding die and without decreasing the degree of freedom in design.

As shown in FIG. 1A to FIG. 4, a first aspect of the invention relates to a fiber reinforced resin gear 1 including a tooth portion 4 formed on an outer peripheral side of a web 3 by injecting a molten resin containing reinforcing fibers into the inside of a cavity 10 through a plurality of pin point gates 13. In this aspect of the invention, a plurality of ejector pins 14 is made to project in a web forming portion 3A in the inside of the cavity 10 and at positions outside the pin point gates 13 in the radial direction before the molten resin containing reinforcing fibers is injected into the inside of the cavity 10 through the pin point gates 13. Further, the ejector pins 14 are retracted from the inside of the cavity 10 after the flow of the molten resin containing reinforcing fibers injected into the inside of the cavity 10 through the pin point gates 13 impinges on the plurality of ejector pins 14 and is divided and before a tooth portion forming portion 4A in the inside of the cavity 10 is filled with the molten resin containing reinforcing fibers, so that weld lines 16 which extend along the radial direction are formed at positions outside the plurality of ejector pins 14 in the radial direction and the molten resin containing reinforcing fibers is filled in portions formed after the ejector pins 14 are retracted.

As shown in FIG. 1A to FIG. 4, a second aspect of the invention relates to a fiber reinforced resin rotary body 1 including a cylindrical portion 4 formed on an outer peripheral side of a disk-shaped portion 3 by injecting a molten resin containing reinforcing fibers into the inside of a cavity 10 through a plurality of pin point gates 13. In this aspect of the invention, a plurality of ejector pins 14 is made to project in a disk-shaped portion forming portion 3A in the inside of the cavity 10 and at positions outside the pin point gates 13 in the radial direction before the molten resin containing reinforcing fibers is injected into the inside of the cavity 10 through the pin point gates 13. Further, the ejector pins 14 are retracted from the inside of the cavity 10 after the flow of the molten resin containing reinforcing fibers injected into the inside of the cavity 10 through the pin point gates 13 impinges on the plurality of ejector pins 14 and is divided and before a cylindrical portion forming portion 4A in the inside of the cavity 10 is filled with the molten resin containing reinforcing fibers, so that weld lines 16 which extend along the radial direction are formed at positions outside the plurality of ejector pins 14 in the radial direction and the molten resin containing reinforcing fibers is filled in portions formed after the ejector pins 14 are retracted.

As shown in FIG. 1A to FIG. 4, a third aspect of the invention relates to a method of injection molding of a fiber reinforced resin gear 1 by injecting a molten resin containing reinforcing fibers into the inside of a cavity 10 through a plurality of pin point gates 13 to form a tooth portion 4 on an outer peripheral side of a web 3. In this aspect of the invention, a plurality of ejector pins 14 is made to project in a web forming portion 3A in the inside of the cavity 10 and at positions outside the pin point gates 13 in the radial direction before the molten resin containing reinforcing fibers is injected into the inside of the cavity 10 through the pin point gates 13. Further, the ejector pins 14 are retracted from the inside of the cavity 10 after the flow of the molten resin containing reinforcing fibers injected into the inside of the cavity 10 through the pin point gates 13 impinges on the plurality of ejector pins 14 and is divided and before a tooth portion forming portion 4A in the inside of the cavity 10 is filled with the molten resin containing reinforcing fibers, so that weld lines 16 which extend along the radial direction are formed at positions outside the plurality of ejector pins 14 in the radial direction and the molten resin containing reinforcing fibers is filled in portions formed after the ejector pins 14 are retracted.

As shown in FIG. 1A to FIG. 4, a fourth aspect of the invention relates to a method of injection molding of a fiber reinforced resin rotary body 1 by injecting a molten resin containing reinforcing fibers into the inside of a cavity 10 through a plurality of pin point gates 13 to form a cylindrical portion 4 on an outer peripheral side of a disk-shaped portion 3. In this aspect of the invention, a plurality of ejector pins 14 is made to project in a disk-shaped portion forming portion 3A in the inside of the cavity 10 and at positions outside the pin point gates 13 in the radial direction before the molten resin containing reinforcing fibers is injected into the inside of the cavity 10 through the pin point gates 13. Further, the ejector pins 14 are retracted from the inside of the cavity 10 after the flow of the molten resin containing reinforcing fibers injected into the inside of the cavity 10 through the pin point gates 13 impinges on the plurality of ejector pins 14 and is divided and before a cylindrical portion forming portion 4A in the inside of the cavity 10 is filled with the molten resin containing reinforcing fibers, so that weld lines 16 which extend along the radial direction are formed at positions outside the plurality of ejector pins 14 in the radial direction and the molten resin containing reinforcing fibers is filled in portions formed after the ejector pins 14 are retracted.

According to the aspects of the invention, the orientation of reinforcing fibers is aligned in the same direction by the ejector pins at the time of performing injection molding and hence, roundness of a tooth portion (cylindrical portion) of the fiber reinforced resin gear (fiber reinforced resin rotary body) can be improved without using an expensive injection molding die whose number of pin point gates is increased.

Further, according to the aspects of the invention, holes corresponding to the ejector pins are not formed in the web (disk-shaped portion) and hence, in forming radial ribs or circumferential ribs on the web (disk-shaped portion), the restriction is hardly imposed on design whereby the degree of freedom in designing the fiber reinforced resin gear (fiber reinforced resin rotary body) can be improved.

Further, the fiber reinforced resin gear (fiber reinforced resin rotary body) according to the aspect of the invention can be also used in cases where the formation of holes in the web (disk-shaped portion) is not allowed from a view point of strength.

BRIEF DESCRIPTION OF THE DRAWINGS

FIG. 1A and FIG. 1B are views showing a fiber reinforced resin gear according to an embodiment of the invention, wherein FIG. 1A is a front view of the fiber reinforced resin gear, and FIG. 1B is a cross-sectional view of the fiber reinforced resin gear taken along a line A1-A1 in FIG. 1A;

FIG. 2A and FIG. 2B are views showing an injection molding die for forming the fiber reinforced resin gear according to the embodiment of the invention, wherein FIG. 2A is a longitudinal cross-sectional view of the injection molding die, and FIG. 2B is a partial cross-sectional view of the injection molding die taken along a line A2-A2 in FIG. 2A;

FIG. 3A to FIG. 3D are views for explaining a method of forming the fiber reinforced resin gear according to the embodiment of the invention by injection molding, wherein FIG. 3A is a view showing a first step, FIG. 3B is a view showing a second step, FIG. 3C is a view showing a third step, and FIG. 3D is a view showing a fourth step;

FIG. 7A and FIG. 7B are views showing a fiber reinforced resin gear according to a third example of related art, wherein FIG. 7A is a front view of the fiber reinforced resin gear, and FIG. 7B is a cross-sectional view of the fiber reinforced resin gear taken along a line A3-A3 in FIG. 7A; and FIG. 8A and FIG. 8B are views showing an injection molding die for forming the fiber reinforced resin gear according to the third example of related art, wherein FIG. 8A is a partial cross-sectional view of the injection molding die, and FIG. 8B is a front view of a cavity taken along a line A4-A4 in FIG. 8A.

DESCRIPTION OF THE PREFERRED EMBODIMENTS

Figure 2A:
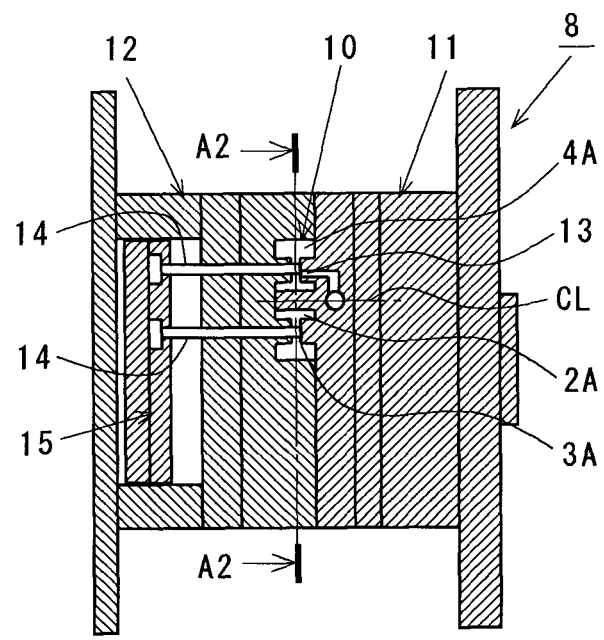

Hereinafter, an embodiment of the invention is explained by reference to drawings.

FIG. 1A and FIG. 1B are views showing a fiber reinforced resin gear 1 which constitutes a fiber reinforced resin rotary body according to the embodiment of the invention. FIG. 1A is a front view of the fiber reinforced resin gear 1, and FIG. 1B is a cross-sectional view of the fiber reinforced resin gear 1 taken along a line A1-A1 in FIG. 1A.

As shown in FIG. 1A and FIG. 1B, the fiber reinforced resin gear 1 of this embodiment includes: a circular-cylindrical boss portion 2 which is positioned at a center portion of the gear 1; a disk-shaped web (disk-shaped portion) 3 which extends outward in the radial direction from a center portion of the boss portion 2 in the axial direction; and a circular cylindrical tooth portion (cylindrical portion) 4 which is connected to a radially outer end of the web 3. The tooth portion 4 is formed such that a plurality of teeth 6 is formed on an outer peripheral side of a circular cylindrical rim 5. A shaft hole 7 is formed in the boss portion 2.

Figure 2B:
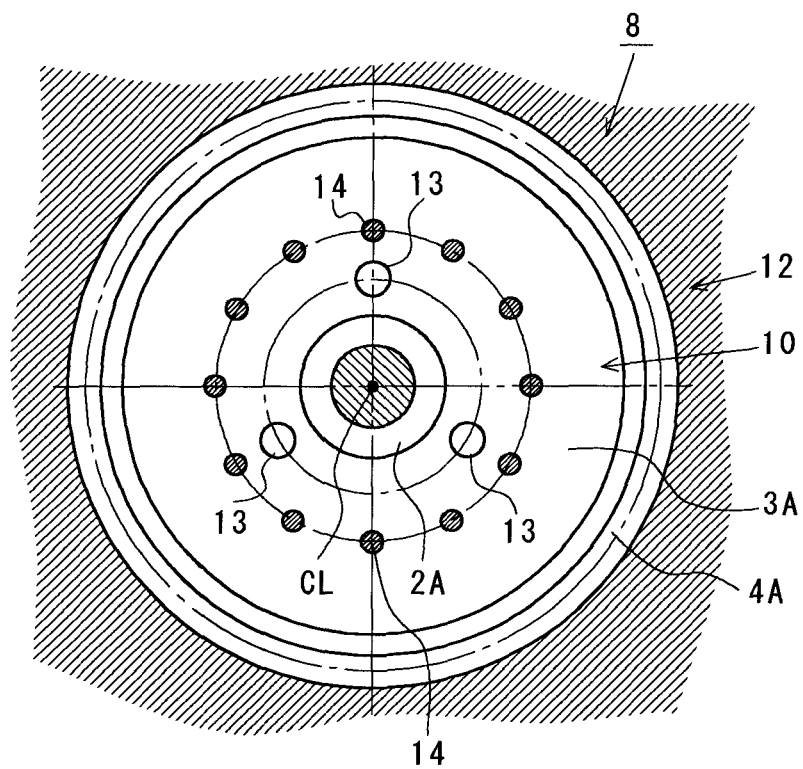

FIG. 2A and FIG. 2B are views showing an injection molding die 8 which can be used for forming the fiber reinforced resin gear 1 according to the embodiment of the invention by injection molding. FIG. 2A is a longitudinal cross-sectional view of the injection molding die 8 immediately before a molten resin containing reinforcing fibers is injected into a cavity 10. FIG. 2B is a partial cross-sectional view of the injection molding die 8 taken along a line A2-A2 in FIG. 2A.

The injection molding die 8 has a two split structure consisting of a fixed die 11 and a movable die 12. The movable die 12 can be moved toward the fixed die 11 from a die open state. By making the movable die 12 abut the fixed die 11 and by fastening the fixed die 11 and the movable die 12 to each other, the cavity 10 is formed on a die mating surface between the fixed die 11 and the movable die 12 (see FIG. 3D). The cavity 10 is a space for forming the fiber reinforced resin gear 1. The cavity 10 includes: a boss portion forming portion 2A for forming the circular cylindrical boss portion 2; a web forming portion (disk-shaped portion forming portion) 3A for forming the disk-shaped web (disk-shaped portion) 3; and a tooth portion forming portion (cylindrical portion forming portion) 4A for forming the circular cylindrical tooth portion (cylindrical portion) 4.

Pin point gates 13 through which a molten resin containing reinforcing fibers (glass fibers, carbon fibers or the like) is injected into the inside of the cavity 10 are formed in the fixed die 11 at three positions. The pin point gates 13 are arranged equidistantly (at 120° intervals) on the circumference about a center axis CL of the cavity 10 such that the pin point gates 13 open in the web forming portion 3A of the cavity 10 at positions close to the boss portion forming portion 2A.

Ejector pins 14 which push out the fiber reinforced resin gear 1 formed by injection molding and remaining in the inside of the cavity 10 from the cavity 10 are formed on the movable die 12 at twelve positions (see FIG. 3D). The ejector pins 14 are mounted on an ejector pin drive plate 15 which is operated independently from the movable die 12 by a drive means (hydraulic cylinder, pneumatic cylinder, cam or link mechanism) not shown in the drawing, and are configured to extend into or to retract from the inside of the web forming portion 3A of the cavity 10 or to be projected to the outside of the cavity 10. The ejector pins 14 are positioned outside the pin point gates 13 in the radial direction, and are arranged equidistantly (at intervals of 30°) on the circumference about the center axis CL of the cavity 10. The ejector pin drive plate 15 and the ejector pins 14 are configured to be moved integrally with the movable die 12.

FIG. 3A to FIG. 3D are views for explaining a method of forming the fiber reinforced resin gear (fiber reinforced resin rotary body) 1 according to the embodiment of the invention by injection molding.

Firstly, as shown in FIG. 3A, the movable die 12 is fastened to the fixed die 11 in a state where the movable die 12 is abutted to the fixed die 11, and the cavity 10 is formed on the mating surface between the movable die 12 and the fixed die 11. At this stage, the ejector pin drive plate 15 is integrally moved with the movable die 12, and the ejector pins 14 are held at a position retracted from the inside of the cavity 10.

Figure 4:
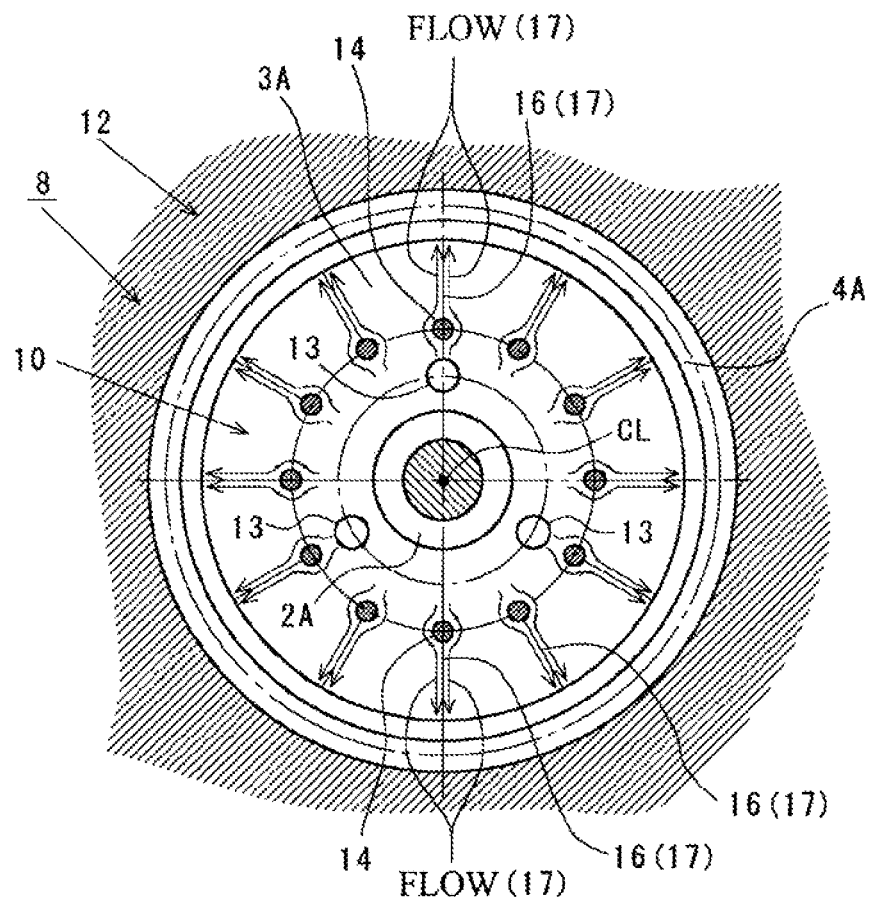
FIG. 4 is a view schematically showing the flow of a molten resin containing reinforcing fibers in a cavity.

Next, as shown in FIG. 3B, before a molten resin containing reinforcing fibers is injected into the inside of the cavity 10 through the pin point gates 13, the ejector pins 14 are pushed into the inside of the cavity 10. Then, the ejector pins 14 are held in a state where distal end surfaces of the ejector pins 14 are brought into contact with the fixed die 11. Next, the molten resin containing reinforcing fibers is injected into the inside of the web forming portion 3A of the cavity 10 through the pin point gates 13. Portions of the molten resin containing reinforcing fibers which are injected into the inside of the web forming portion 3A of the cavity 10 through the pin point gates 13 form the flow toward the outside in the radial direction (toward the tooth portion forming portion 4A). Each portion of the molten resin impinges on the ejector pins 14 and is divided into branched flows and, thereafter, the branched flows are merged at a position outside the ejector pins 14 in the radial direction, and the merged flow of molten resin containing reinforcing fibers forms the flow toward the outside in the radial direction (see FIG. 4). At each merged flow portion of the molten resin containing reinforcing fibers, a weld line 16 which extends outward in the radial direction along the flow of the molten resin containing reinforcing fibers is generated. Further, on the weld line 16 and in areas in the vicinity of the weld line 16, the direction of reinforcing fibers 17 is aligned along the weld line 16 (along the flow of the molten resin containing reinforcing fibers) (see FIG. 1A, FIG. 1B and FIG. 4). The weld lines 16, the number (12) of which is equal to the number of ejector pins 14, are formed. Accordingly, twelve pieces of ejector pins 14 function in the same manner as the pin point gates at twelve positions, thus forming the weld lines 16 at twelve positions and hence, the direction of the reinforcing fibers 17 is aligned along the weld lines 16 at twelve positions (see FIG. 1A, FIG. 1B and FIG. 4).

Next, as shown in FIG. 3C, before the filling of the molten resin containing reinforcing fibers into the inside of the tooth portion forming portion 4A is completed (before the tooth portion forming portion 4A of the cavity 10 is filled with the molten resin containing reinforcing fibers), the ejector pins 14 are retracted (pulled out) from the inside of the cavity 10. At this point of time, the molten resin containing reinforcing fibers in the inside of the cavity 10 still has the fluidity and hence, spaces formed after the ejector pins 14 are retracted from the inside of the cavity 10 are filled with the molten resin containing reinforcing fibers. As a result, as shown in FIG. 1A and FIG. 1B, holes corresponding to the ejector pins 14 are not formed in the web 3 of the fiber reinforced resin gear 1 after the injection molding. In the fiber reinforced resin gear 1 shown in FIG. 1A and FIG. 1B, to clearly indicate the positions and the orientations of the weld lines 16 and the reinforcing fibers 17, the positions of the pin point gates 13 and positions of the ejector pins 14 are shown by fine lines.

Next, as shown in FIG. 3D, the movable die 12 is separated from the fixed die 11, and the fiber reinforced resin gear 1 which is disposed in the inside of the cavity 10 in a solidified state by being cooled is pushed out from the inside of the cavity 10 by twelve pieces of ejector pins 14 so that the fiber reinforced resin gear 1 formed into a shape shown in FIG. 1A and FIG. 1B by injection molding is separated (taken out) from the movable die 12.

Figure 5:
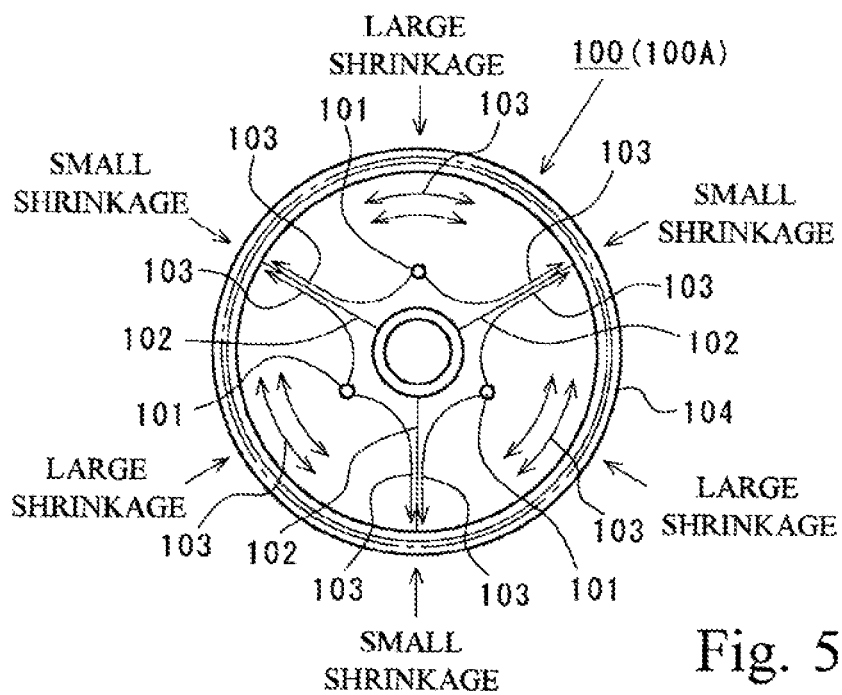
FIG. 5 is a front view showing a fiber reinforced resin gear according to a first example of related art, and is also a view schematically showing the flow of a molten resin containing reinforcing fibers in a cavity at the time of forming the fiber reinforced resin gear by injection molding in an overlapping manner.
Figure 6:
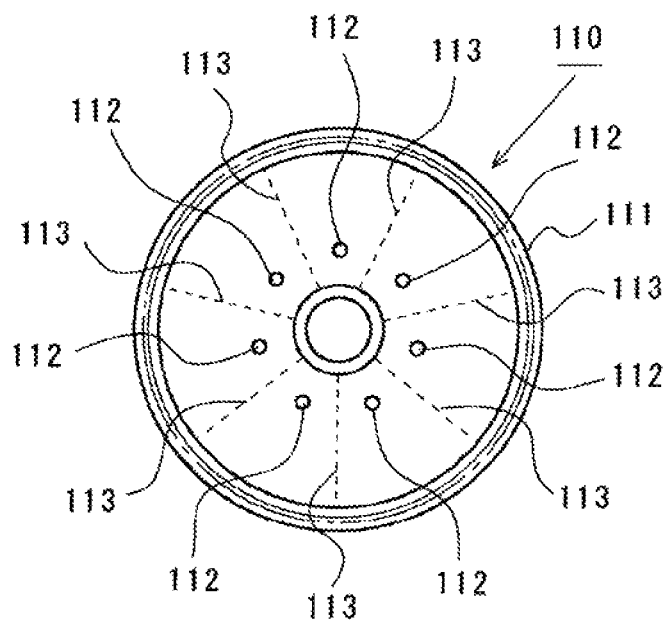
FIG. 6 is a front view showing a fiber reinforced resin gear according to a second example of related art, and is also a view showing the relationship between pin point gates and weld lines in an overlapping manner.
Figures 7A, 7B:
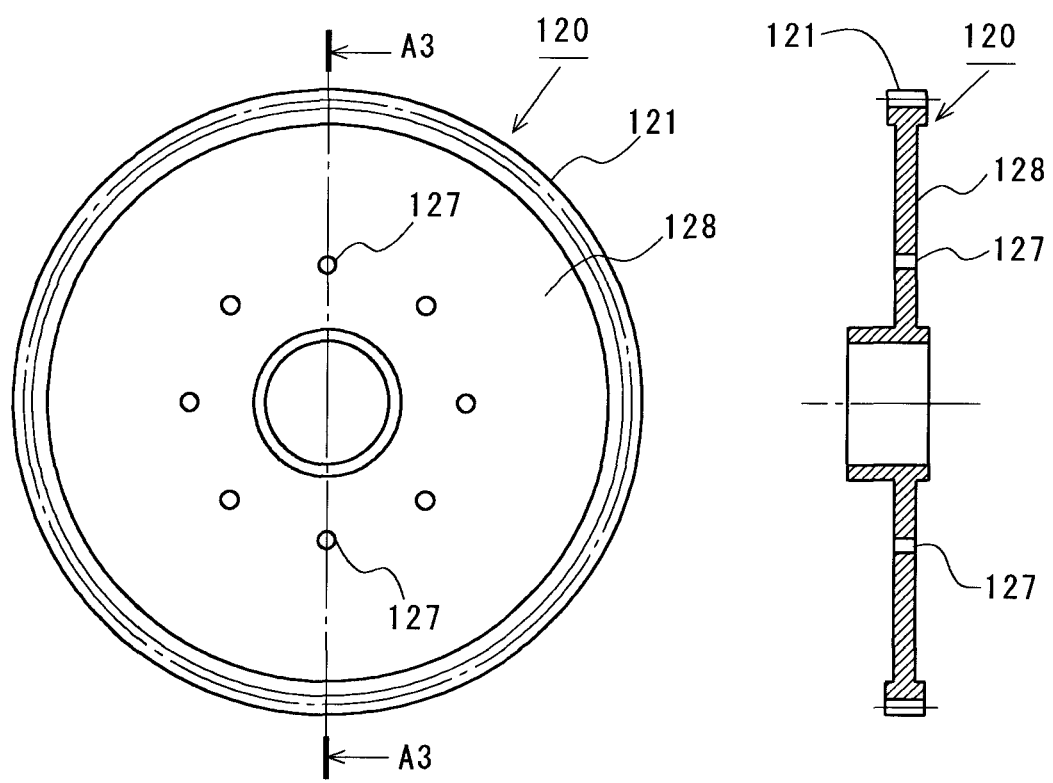
Figure 8A:
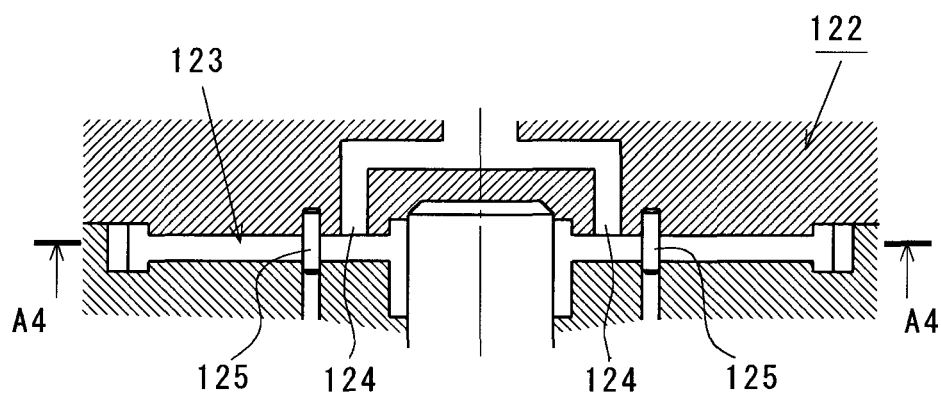
Figure 8B:
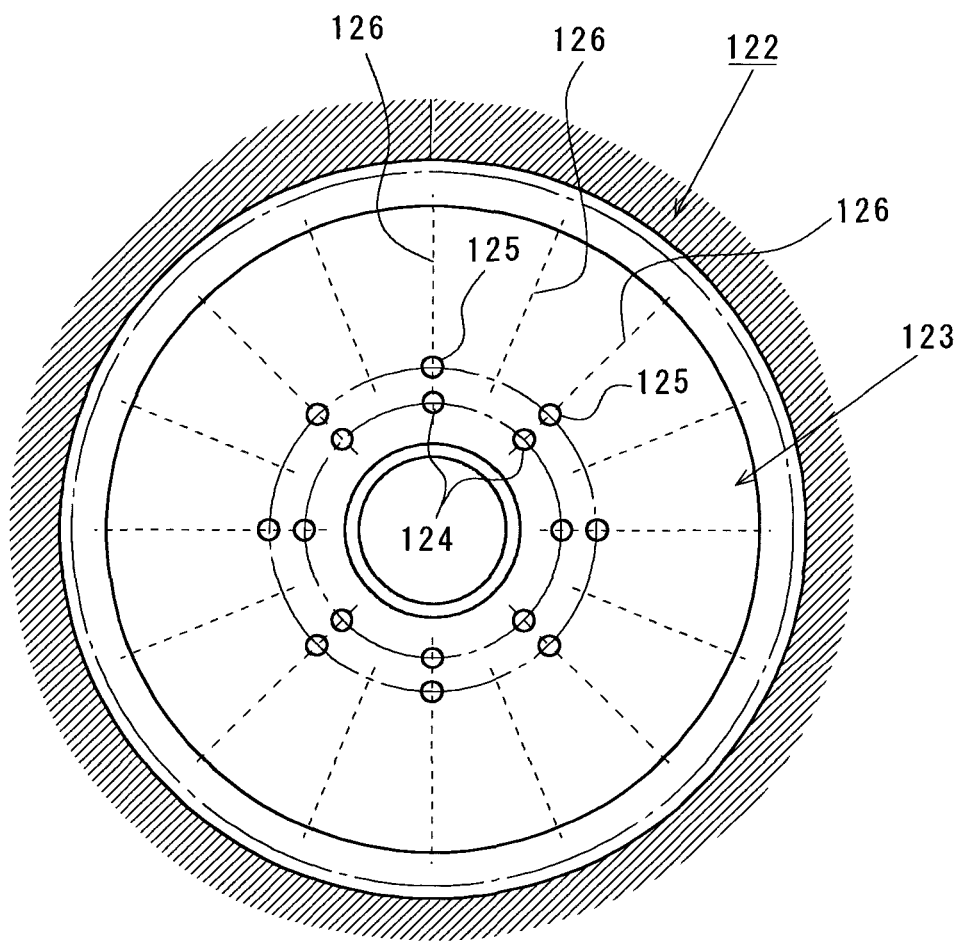

With respect to the fiber reinforced resin gear 1 according to the embodiment shown in FIG. 1A and FIG. 1B, which is formed by injection molding as described above and a fiber reinforced resin gear 100 according to a first example of related art shown in FIG. 5, a 1-pitch mesh error, a total mesh error and addendum roundness are measured. The result of measured values are shown in Table 1 such that the measured values can be compared to each other. The fiber reinforced resin gear 1 (the invention product) shown in FIG. 1A and FIG. 1B and the fiber reinforced resin gear 100 (the product of related art) shown in FIG. 5 have the same shape except for a state where the weld lines 16, 102 are formed. That is, both gears 1, 100 are full-depth-tooth gears with an involute tooth profile in which a module is set to 1, a pressure angle is set to 20°, a helical angle is set to 0°, and the number of teeth is set to 30. Both the invention product and the product of related art are formed by molding using Zytel 70G 33L (the content of polyamide 66 glass fiber reinforcing material: 33%) produced by E.I. du Pont de Nemours & Company (Inc.), for example.

TABLE 1

| | 1-pitch mesh error | total mesh error | (unit: μm) addendum roundness |
|---|---|---|---|
| invention product | 29.5 | 59.0 | 29.1 |
| product of related art | 51.3 | 124.9 | 64.3 |

As shown in Table 1, compared to the fiber reinforced resin gear 100 according to the first example of related art (the product of related art) shown in FIG. 5, the fiber reinforced resin gear 1 according to the embodiment of the invention (the invention product) improved a 1-pitch mesh error by 21.8 μm, improved a total mesh error by 65.9 μm, and improved addendum roundness by 35.2 μm.

As described above, in the fiber reinforced resin gear 1 according to the embodiment of the invention, the orientation of the reinforcing fibers 17 is aligned along the radial direction by the ejector pins 14 at the time of injection molding and hence, addendum roundness can be improved without using an expensive injection molding die 8 whose number of pin point gates 13 is increased (cost of machining the pin point gates 13 being pushed up) and, at the same time, a mesh error can be decreased.

In the fiber reinforced resin gear 1 according to the embodiment of the invention, holes corresponding to the ejector pins 14 are not formed in the web 3. Accordingly, when the formation of the holes in the web 3 is not allowed from a viewpoint of strength of the fiber reinforced resin gear 1 or when radial ribs or circumferential ribs are formed on the web 3, the restriction is minimally imposed on design and hence, the degree of freedom in designing the fiber reinforced resin gear 1 can be increased.

In the injection molding die 8 for forming the fiber reinforced resin gear 1 according to the above-mentioned embodiment, the number of positions where the pin point gate 13 is formed is not limited to three, and may be basically the number of pin point gates suitable for forming the fiber reinforced resin gear 1 (the number of pin point gates being adopted conventionally corresponding to fiber reinforced resin gears 1 having the different gear shapes or the like). Unless the pin point gates 13 are newly added aiming at the improvement of addendum roundness, the number of positions where the pin point gate 13 is formed may be two or four or more.

The injection molding die 8 for the fiber reinforced resin gear 1 according to the above-mentioned embodiment is explained by taking the mode in which twelve pieces of ejector pins 14 are mounted as an example. However, provided that the desired addendum roundness can be acquired, the number of ejector pins 14 may be any proper number other than twelve.

The injection molding die 8 for the fiber reinforced resin gear 1 according to the above-mentioned embodiment is explained by taking the mode in which the ejector pins 14 are arranged on the same circumference equidistantly as an example. However, provided that the ejector pins 14 perform a function of forming weld lines in the same manner as the pin point gates so that the fiber reinforced resin gear 1 having the desired addendum roundness can be formed by injection molding, the injection molding die 8 may be an injection molding die whose ejector pins 14 are arranged on the same circumference non-equidistantly or may be an injection molding die whose ejector pins 14 are arranged at random in the circumferential direction and in the radial direction.

The injection molding die 8 for the fiber reinforced resin gear 1 according to the above-mentioned embodiment is explained by taking the mode in which twelve pieces of ejector pins 14 having the same diameter are provided as an example. However, the diameter of the ejector pin 14 may be changed corresponding to positions of the pin point gates 13 or the like, provided that the fiber reinforced resin gear 1 having the desired addendum roundness can be formed by injection molding. For example, the injection molding die 8 may be configured such that the ejector pin 14 closest to the pin point gate 13 has the largest diameter and the diameter of the ejector pin 14 is gradually decreased along with the increase of the distance to the ejector pin 14 from the pin point gate 13.

The fiber reinforced resin rotary body according to the invention is not limited to the above-mentioned fiber reinforced resin gear 1, and is also applicable to a fiber reinforced resin sprocket having a cylindrical portion where a plurality of teeth are formed on an outer periphery of the cylindrical portion, a fiber reinforced resin pulley having a cylindrical portion where a belt is wound around an outer periphery of the cylindrical portion, and a fiber reinforced resin roller having a cylindrical portion which makes rolling contact on an outer peripheral side thereof.

The fiber reinforced resin gear according to the invention is not limited to a spur gear, and is also applicable to a helical gear and a double helical gear.

What is claimed is:

1. A method of injection molding of a fiber reinforced resin gear by injecting a molten resin containing reinforcing fibers into the inside of a cavity through a plurality of pin point gates to form a tooth portion on an outer peripheral side of a web, wherein
    a plurality of ejector pins are made to project in a web forming portion in the inside of the cavity and at positions outside the pin point gates in the radial direction before the molten resin containing reinforcing fibers is injected into the inside of the cavity through the pin point gates, and
    the plurality of ejector pins are retracted from the inside of the cavity after the flow of the molten resin containing reinforcing fibers injected into the inside of the cavity through the pin point gates impinges on the plurality of ejector pins and is divided and before a tooth portion forming portion in the inside of the cavity is filled with the molten resin containing reinforcing fibers, so that weld lines which extend along the radial direction are formed at positions outside the plurality of ejector pins in the radial direction and the molten resin containing reinforcing fibers is filled in portions formed after the plurality of ejector pins are retracted.

2. A method of injection molding of a fiber reinforced resin rotary body by injecting a molten resin containing reinforcing fibers into the inside of a cavity through a plurality of pin point gates to form a cylindrical portion on an outer peripheral side of a disk-shaped portion, wherein
    a plurality of ejector pins are made to project in a disk-shaped portion forming portion in the inside of the cavity and at positions outside the pin point gates in the radial direction before the molten resin containing reinforcing fibers is injected into the inside of the cavity through the pin point gates, and
    the plurality of ejector pins are retracted from the inside of the cavity after the flow of the molten resin containing reinforcing fibers injected into the inside of the cavity through the pin point gates impinges on the plurality of ejector pins and is divided and before a cylindrical portion forming portion in the inside of the cavity is filled with the molten resin containing reinforcing fibers, so that weld lines which extend along the radial direction are formed at positions outside the plurality of ejector pins in the radial direction and the molten resin containing reinforcing fibers is filled in portions formed after the plurality of ejector pins are retracted.

* * * * *